Nov. 11, 1952   J. R. EMMETT ET AL   2,617,766
ION-EXCHANGE PROCESSES FOR THE TREATMENT OF WATER
Filed Dec. 5, 1950
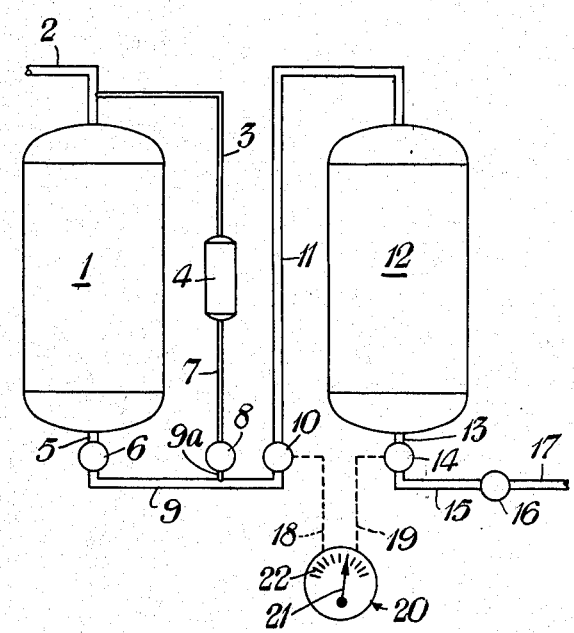
Inventors
James Ratcliffe Emmett
Henry Alfred Matthews
By Flocks and Simon
Attorneys

UNITED STATES PATENT OFFICE 2,617,766

ION-EXCHANGE PROCESSES FOR THE TREATMENT OF WATER

James Ratcliffe Emmett, Cranham, Upminster, and Henry Alfred Matthews, Hayes, England, assignors to Ewbank and Partners Limited, London, England, a company of Great Britain Application December 5, 1950, Serial No. 199,202
In Great Britain December 8, 1949

4 Claims. (Cl. 210—24)

This invention relates to ion-exchange processes for the treatment of water in which the raw water is passed in succession through a unit (the "cation unit") containing a cation exchange material, such for example as sulphonated coal or sulphonated phenol-formaldehyde resins, and a unit (the "anion unit") containing an anion exchange material, such for example as an amino-aldehyde resin, and in which the active materials are intended to be regenerated from time to time, when exhausted or substantially so, by running through each of the units a solution of a suitable regenerant chemical (an acid, for example, for the cation unit and an alkali, for example, for the anion unit) while the supply of the water to be treated is interrupted.

When such processes were first introduced it was necessary to carry out routine analytical tests in order to determine when a unit required regeneration, since small changes in the quality of the raw water may produce substantial changes in the rate of exhaustion of the active materials. The appreciable labour costs thus occasioned were reduced somewhat, subsequently, by providing instruments for continuously measuring or recording the electrical conductivity of the final treated water, an increase in the conductivity indicating that one of the units required regeneration. Analytical tests still had to be carried out in order to determine which unit had exhausted and if this proved to be the cation unit the water in the anion unit, not being completely decationised, had to be discharged to waste. Still later, however, instruments for measuring differential conductivity values between partially decationised water and completely decationised water were adopted so that an indication could be secured of the exhaustion of the cation unit, the instrument for measuring the conductivity of the water leaving the anion unit then serving to indicate exhaustion of the anion unit only.

Processes and plants operated in accordance with these latest refinements require much less labour for their operation than those initially installed but still suffer from a disadvantage in those cases, which are quite numerous, where the ratio between the bicarbonate alkalinity and the total ionised solids content of the water to be treated varies from the accepted value by even small amounts. These changes cause the anion and cation units to require regeneration at different times whereas they would both be exhausted together if the ratio referred to remained at the accepted value.

For example, in a typical case where the water has a bicarbonate alkalinity of 200 parts per million (calculated as $CaCO_3$) and a total ionised solids content of 400 parts per million (calculated as $CaCO_3$), a plant for treating this water at a rate of 1,000 gallons per hour would comprise 28.0 cubic feet of a cation exchange material having a capacity of 8,000 grains per cubic foot and 11.2 cubic feet of an anion exchange material having a capacity of 10,000 grains per cubic foot. The period between regenerations would be 8 hours and the time required for regenerating either unit alone would be about 1.25 hours (for both together it could be effected in about 1.5 hours).

Should the bicarbonate alkalinity of the water increase to 225 parts per million (as $CaCO_3$), and the total ionised solids decrease to 375 p. p. m., the period between regenerations of the cation unit would be increased to 8.5 hours but the period between regenerations of the anion unit would be increased to 10.7 hours.

The alternatives available to the operating personnel would be (1) to regenerate each unit in turn as it became exhausted or (2) to regenerate both units when the cation unit became exhausted. The first course would entail shutting down the plant for a period of 2.5 hours in each period of 13.2 hours, with the personnel engaged for 2.5 hours, and the second course would reduce the shut-down period to 1.5 hours in each period of 10 hours but with a wastage of the regenerant chemical employed for the anion unit amounting to approximately 20%, since the full amount would have to be used because the degree of exhaustion of the unit would not be known.

It is the object of the present invention, therefore, to provide an improved method of and means for use in operating a process of the character referred to above whereby the two units may be regenerated simultaneously without waste of regenerant chemicals.

According to this invention a method of operating an ion-exchange process for the treatment of water includes the steps of continuously measuring the conductivity of the decationised water prior to its entry into the anion unit, continuously measuring the rate of flow of the water through the unit, automatically combining the indications thus obtained to produce a continuous indication of the degree of exhaustion of the anion exchange material, and determining the quantity of the regenerant chemical to be employed in accordance with the value of the last-mentioned indication at the time when the anion unit is to be regenerated.

The invention also consists in apparatus for treating water by an ion-exchange process, including a cation unit and an anion unit to be traversed in succession by the water to be treated, wherein means is provided for measuring the conductivity of the water flowing from the cation unit to the anion unit, means is provided for measuring the rate of flow of this water and further means is provided for integrating the indications of the first two means in order to produce an indication varying with the degree of exhaustion of the anion exchange material.

One way of carrying the invention into practical effect will now be described with reference to the accompanying drawing, the single figure of which is a diagrammatic representation of a water treatment plant with the known means for effecting backwashing and regeneration of the units omitted.

In the example illustrated, the cation and anion units of a plant for treating water by an ion-exchange process are arranged in the usual fashion and provided with the known instrumentation referred to above whereby the substantially complete exhaustion of the cation exchange material or of the anion exchange material may be separately notified to the operating personnel in an automatic manner as and when it occurs. There is additionally provided, in accordance with this invention, an instrument which continuously measures both the electrical conductivity of and the rate of flow of the decationised water flowing to the anion unit and integrates the indications produced so that it causes the movement of a member by an amount which varies with the degree of exhaustion of the anion exchange material.

The cation unit comprises a vessel 1 containing a suitable cation exchange material (not shown), such as sulphonated coal, and is supplied with the raw water to be treated by way of a pipe 2. A small but constant proportion of the raw water is bled off from the pipe 2 by means of a pipe 3 and is conducted thereby into an auxiliary vessel 4 containing a quantity of the same cation exchange material as is placed in the vessel 1, this quantity being so determined that it will never be exhausted before the material in the vessel 1 is exhausted. The decationised water leaving the vessel 1 is conducted by a pipe 5 to an instrument 6 (of known type) for measuring the electrical conductivity of this water, and the decationised water leaving the vessel 4 is similarly conducted by a pipe 7 to a similar conductivity water 8. The instruments or meters 6, 8, are associated in the known manner so that a decrease in the conductivity of the water leaving the vessel 1 in relation to the conductivity of the water leaving the vessel 4 will produce an indication, or give an audible or visible warning, showing that the cation unit 1 is exhausted and requires regeneration.

The outlet side of the meter 6 is connected by a pipe 9 to the inlet side of a further conductivity meter 10, the outlet side of the meter 8 discharging into the same pipe 9 by way of a connection 9a. From the outlet side of the meter 10 a pipe 11 leads to the inlet of an anion unit composed of a vessel 12 containing a suitable anion exchange material (not shown), such as an aminoaldehyde resin.

A pipe 13 conducts the treated water leaving the unit 12 to the inlet side of a flow meter 14, from the outlet side of which a pipe 15 leads the water to an electrical conductivity meter 16 that finally discharges the water to a pipe 17 leading to the point at which the water is to be consumed. The meter 16 is of a known type and arranged, in the known manner, to produce an indication or give an audible or visible warning, when the conductivity of the water leaving the unit 12 increases, this showing that the anion unit 12 is exhausted and requires regeneration.

It will be seen from the foregoing that, in addition to the known instrumentation represented by the conductivity meters 6, 8 and 16, the plant according to this invention is provided with an instrument (meter 10) which continuously measures the electrical conductivity of the decationised water flowing to the anion unit 12 and an instrument (flow meter 14) which continuously measures the rate of flow of this water through the anion unit. As indicated by the broken lines 18 and 19, the outputs of the meters 10 and 14 are respectively connected to an integrating instrument 20 in order to cause movement of its pointer 21 over a calibrated scale 22 by an amount which varies with the degree of exhaustion of the anion exchange material in the unit 12.

The conductivity of the decationised water flowing through the meter 10 is almost entirely due to the presence of sulphuric and hydrochloric acids in solution therein and the mobilities of the sulphate and chloride ions are sufficiently close to each other to ensure that there will be but a negligible error in adopting a relationship between conductivity of the decationised water and equivalent concentration of the two acids therein which is correct for one only of those acids. At the concentrations concerned, this relationship is sufficiently close to a linear one so that integration of the measurements of the conductivity gives a measure of the concentration of the acids in the water flowing to the anion unit and this appropriately combined with the volume of the water which has flowed into the unit since a run was started yields the total weight of the acids which have entered the unit during the run. Consequently, the movement of the pointer 21 operated by the instrument 20 is proportional to the degree of exhaustion of the anion exchange material and the scale 22 may be calibrated in pounds weight of regenerant chemical, due to allowance being made for the regenerant efficiency.

When the cation unit 1 is exhausted, therefore, it is a simple matter to regenerate both units 1 and 12 at the same time, the quantity of the regenerant chemical used for the anion unit 12 being determined in accordance with the position of the pointer 21 relative to the scale 22.

There are many instruments known which will integrate the indications continuously produced by two measuring instruments, of the character of a flow meter and a conductivity meter, in the manner set forth above. As an example, which is in no way limitative, the integrating instrument may be a sensitive watt-hour meter having its potential coil supplied with a voltage proportional to the indication produced by the flow meter and its current coil supplied with a current proportional to the indication produced by the conductivity meter. The rotor or disc of the watt-hour meter may then drive the pointer 21 through reduction gearing. Alternatively, the flow meter may include a rotary element the speed of which is proportional to the rate of flow of the treated water, and the current passed by the conductivity meter may, after amplification if required, control the setting of an infinitely variable reduction gear through which the rotary element drives the pointer 21. Again, the flow meter may vary the potential applied to the electrodes of the conductivity meter in accordance with the rate of flow of the water, the current passed through the latter between the electrodes being supplied to the current coil of a sensitive watt-hour meter which has its potential coil supplied from a constant voltage source and the rotor or disc of which drives the pointer 21. Many other examples of suitable arrangements are available and the present invention is not concerned with the nature of the integrating instrument as such but merely with the employment of a suitable such instrument in the manner indicated above.

Instead of operating a pointer, or in addition to this, the output of the integrating instrument may displace a member which is associated with control mechanism adapted automatically to supply the required weight of regenerant chemical when a regeneration is carried out. For example, a supply of a solution of the chemical at a standard concentration may be arranged so that it is fed into a stream of water used for regenerating the anion unit under the control of a valve which is opened either automatically or by the operator but is closed automatically when the quantity of concentrated solution delivered corresponds to the setting of the member referred to above. This member may "set up" a quantity mechanism in the manner usual in commodity meters and a flow meter in the path of the concentrated solution may cause the "running down" of the mechanism with the closing of the valve when the quantity set up has been supplied. It is thought that this mechanism will be clearly understandable without illustration.

The capacity of anion exchange materials is different for hydrochloric and sulphuric acids so that any change in the chloride/sulphate ratio also affects the period of time between regenerations. In most circumstances, changes in the ratio will be negligible. However, where this does not apply, this ratio may be ascertained from a simple chloride determination and an appropriate correction applied to the indication given by the integrating instrument.

What we claim is:

1. A method of treating water comprising introducing the water to be treated in a unit containing a cation exchange material, measuring the conductivity of the decationized water, passing the decationized water to a unit containing an anion exchange material, continuously measuring the rate of flow of the water through the latter unit, and determining the degree of exhaustion of said anion exchange material, the last step comprising automatically combining the measurement of the conductivity of the decationized water and the indication of the rate of flow through the unit containing the anion exchange material.

2. A method of treating water comprising introducing the water to be treated into a cation unit, passing the decationized water to an anion unit containing anion exchange material, and determining the degree of exhaustion of said anion exchange material, the last step comprising automatically combining the measurement of the conductivity of the decationized water and the rate of flow of the water through said anion unit.

3. Apparatus for treating water comprising a first unit for receiving the water to be treated, said first unit containing cation exchange material, a second unit in series with said first unit receiving decationized water from said first unit, said second unit containing anion exchange material, a first measuring device disposed between said first and second units adapted to measure the conductivity of the decationized water, a second measuring device located after said second unit and adapted to continuously measure the rate of flow of the water through said second unit, and a third measuring device operatively connected to said first and second measuring devices, adapted to determine the degree of exhaustion of anion exchange material in said second unit, thereby indicating the quantity of a regenerate material required by said second unit.

4. Apparatus for treating water comprising a cation unit receiving water to be treated, an anion unit containing anion exchange material receiving decationized water from said cation unit, a first indicator operatively associated with said cation unit adapted to measure the conductivity of the decationized water, a second indicator operatively associated with said anion unit adapted to continuously measure the rate of flow of water through said anion unit, and a third indicator operatively connected to said first and second indicators automatically combining the results thereof, thereby determining the degree of exhaustion of said anion exchange material.

JAMES RATCLIFFE EMMETT.
HENRY ALFRED MATTHEWS.

REFERENCES CITED

The following references are of record in the file of this patent:

FOREIGN PATENTS

| Number | Country | Date |
|---|---|---|
| 437,857 | Great Britain | Nov. 6, 1935 |
| 569,660 | Great Britain | June 4, 1945 |